United States Patent [19]

Stut

[11] 3,821,515

[45] June 28, 1974

[54] APPARATUS FOR THE CONTROL OF ELECTRICAL HEATING

[75] Inventor: Hans Stut, Groebenzell, Germany

[73] Assignee: Siemens Aktiengesellschaft, Berlin and Munich, Germany

[22] Filed: Jan. 4, 1973

[21] Appl. No.: 321,034

[30] Foreign Application Priority Data
Jan. 17, 1972  Germany............................ 2201999

[52] U.S. Cl.................. 219/497, 219/498, 219/501
[51] Int. Cl............................................... H05b 1/02
[58] Field of Search........... 219/494, 497, 499, 501, 219/490, 482, 504, 505, 498; 307/252 B, 229, 230; 330/85, 110

[56] References Cited
UNITED STATES PATENTS

| | | | |
|---|---|---|---|
| 3,336,517 | 8/1967 | Cain | 307/252 B UX |
| 3,412,339 | 11/1968 | Koning | 307/230 X |
| 3,436,559 | 4/1969 | Wajas | 307/229 |
| 3,532,855 | 10/1970 | VanCleave | 219/497 X |
| 3,551,694 | 12/1970 | Boxall | 307/229 |
| 3,566,151 | 2/1971 | Wilburn | 219/497 X |
| 3,678,247 | 7/1972 | Sawa et al | 219/499 X |

*Primary Examiner*—J. D. Miller
*Assistant Examiner*—F. E. Bell
*Attorney, Agent, or Firm*—Hill, Gross, Simpson, Van Santeen, Steadman, Chiara & Simpson

[57] ABSTRACT

Apparatus for controlling the electrical heating of a semiconductor rod as it is being formed by deposition of semiconductor material from a gaseous atmosphere includes a switching circuit for connecting an a.c. power source in series with the semiconductor rod for heating the same, a rectifier inductively coupled with the heating circuit for deriving a d.c. signal proportional to the arithmetic mean value heating current, and amplifier means having a feedback network for generating a d.c. voltage for controlling operation of the switching circuit in accordance with the effective value of the heating current. In another form of the apparatus, an amplifier having a feedback network has its input connected to an a.c. signal proportional to the heating current and generates a d.c. voltage which is a function of the effective heating current for controlling operation of the switching circuit.

6 Claims, 4 Drawing Figures

APPARATUS FOR THE CONTROL OF ELECTRICAL HEATING

BACKGROUND OF THE INVENTION

1. Field of the Invention

The present invention relates to apparatus for controlling electrical heating, and more particularly to such apparatus as employed in connection with the uniform electrical heating of a semiconductor rod with a source of a.c. voltage by means of a switching circuit.

2. The Prior Art

It is necessary to maintain a semiconductor rod at a uniform temperature during a process in which semiconductor material is deposited onto the rod from a gaseous atmosphere. If the temperature of the rod is not maintained at a uniform level, the deposition of the semiconductor material is not at a uniform rate and the result is unsatisfactory. A preferred way of heating the rod is to pass an electrical current through it, so that power is dissipated in the rod in proportion to the product of the square of the effective current and the resistance of the rod.

During the course of the process, as the diameter of the rod increases as a result of deposition of additional material from the gaseous atmosphere, the electrical resistance of a fixed length of the rod decreases, and its surface area increases.

The increasing surface area requires that more power be dissipated in the rod to maintain it at a uniform temperature, while the increasing diameter continually modifies the voltage-current characteristic of the rod.

It is necessary, therefore, to provide a means for controlling and regulating the voltage applied across the semiconductor rod, in order to maintain a uniform temperature throughout the process. Such a control means must act very rapidly in response to the changing characteristics of the semiconductor rod in order to preserve stability, and must act more rapidly than the thermal time constant of the silicon material. It is therefore not satisfactory to operate the control in response to the temperature of the rod, and a faster acting system is necessary for optimum results. A control system which is responsive to the average current flowing through the semiconductor rod has been proposed. For many purposes this kind of arrangement is satisfactory. However, such a system responds only to the arithmetic mean value of the heating current and there are situations in which the arithmetic mean value of the heating current is not a reliable index of the temperature of the rod. This is particularly true when an a.c. current is passed through the rod for heating it, and the form factor of the a.c. signal is not uniform throughout the process. For example, when an SCR or triac is used to switch on a connection to the a.c. source during portions of half cycles of the a.c. signal, the form factor changes with the conduction angle of the switch. For very small conduction angles, the mean current differs greatly from the effective or r.m.s. current. Moreover, when the silicon material has a large negative temperature coefficient, the effective current differs from the mean current. When the heating control is responsive to mean current, it is easy to maintain the mean current constant. However, this is not successful in maintaining the temperature constant in the situations referred to above. It is, therefore, desirable to provide a control arrangement which is responsive to the effective current flowing through the semiconductor rod rather than the mean value thereof.

SUMMARY OF THE INVENTION

It is a principal object of the present invention to provide means for controlling the electrical heating of a semiconductor rod in accordance with the effective value of current flowing therethrough.

A further object of the present invention is to provide apparatus for modifying a signal which is responsive to the mean value of a current, to another signal which is proportional to an exponential function of such current.

Another object of the present invention is to provide apparatus for deriving a control signal responsive to the effective heating current from an a.c. signal having a variable form factor.

A further object of the present invention is to provide a system which derives a control signal in response to the effective heating current flowing through a semiconductor rod, irrespective of the conduction angle of an electronic switch by which said rod is heated with a.c. power.

These and other objects and advantages of the present invention will become manifest upon an examination of the following description and the accompanying drawings.

In one embodiment of the present invention there is provided a power circuit including an electronic switch for applying portions of half cycles of an a.c. power source to a seminconductor rod, detector means inductively coupled with the power circuit for driving a first signal proportional to the arithmetic mean value of the current in the power circuit, and means for modifying the first signal to produce a control signal proportional to the effective current in the power circuit, and means for controlling the electronic switch in response to the control signal.

BRIEF DESCRIPTION OF THE DRAWINGS

Reference will now be made to the accompanying drawings in which.

DESCRIPTION OF THE PREFERRED EMBODIMENT

Figure 1:
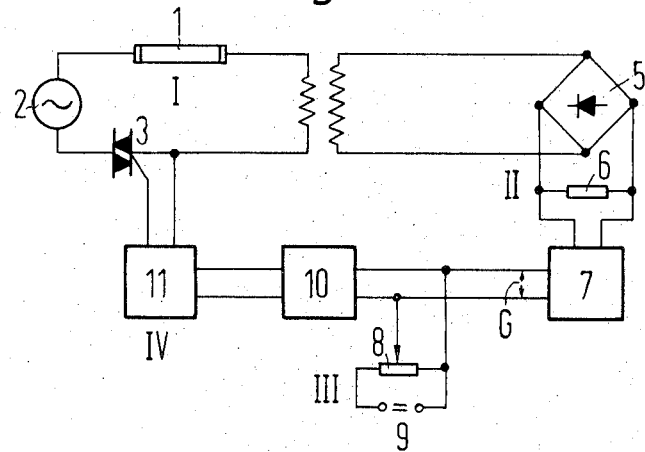
FIG. 1 is a functional block diagram of apparatus incorporating an illustrative embodiment of the present invention.

FIG. 1 illustrates a system having a semiconductor rod 1 connected in series with a source 2 of a.c. power, so that an a.c. heating current flows through the semiconductor rod 1 to maintain it in a heated condition. The flow of a.c. current is controlled by an electronic switch 3, which is preferably of the type known as a triac, and which is regulated in its conduction by a control unit 11 of conventional design. The control unit functions to render the triac 3 conductive at a selected time during each half cycle, after which the triac 3 remains conductive until it is quenched automatically at the end of the half cycle.

The control unit 11 is connected to a modifier unit 10 which produced a control voltage, the amplitude of which causes the control unit 11 to regulate the firing point in each half cycle. The firing angle $\alpha$, at which the triac is fired during every half cycle, changes in proportion to the control voltage supplied to the unit 11 by the unit 10. The conduction angle $\phi$, during which the triac 3 is conductive is $\pi - \alpha$.

A full-wave rectifier 5 has its input terminals inductively coupled with the power circuit including the rod 1 and the power source 2, by means of transformer 20. The voltage induced in the secondary of the transformer 20 is proportional to the current flowing through its primary, and the full-wave rectifier 5 produces across a load resistor 6 a pulsating d.c. voltage having a mean amplitude corresponding to the mean current flowing through the power circuit. A low-pass filter 7 has its input terminals connected across the resistor 6 and produces at its output terminals a d.c. potential G proportional to the arithmetic mean value of the voltage appearing across the resistor 6. Accordingly, the voltage G is proportional to the arithmetic mean value of the current flowing through the power circuit.

The output terminals of the filter 7 are connected to two input terminals of the modifier unit 10, which modifies the voltage G to produce the control voltage which is supplied to the control unit 11. A potentiometer 8 is connected across a source of d.c. potential 9, and the tap of the potentiometer 8 is connected to one of the input lines of the modifier unit 10, while a reference potential at an end of the potentiometer 8 is connected to the other input line. By adjusting the position of the tap of the potentiometer 8, a bias potential is arithmetically added to the potential G, which has the effect of shifting the input signal applied to the modifier unit 10. By this means, an operator may select a desired effective current value to be maintained.

As discussed above, it is desirable to maintain the semiconductor rod 1 at a uniform temperature during the course of a process in which the diameter of the rod grows from a minimum to a maximum value. In one illustrative process, the diameter may initially be about 5 millimeters, and grow to approximately 150 millimeters at the conclusion of the process. In order to maintain a uniform temperature within the rod 1, the power which is dissipated therein must be approximately proportional to the surface area of the rod, which is proportional to its diameter (the length being constant). However, as the diameter grows, the resistance of the rod decreases, which sharply changes the voltage current characteristic of the rod 1.

Since the power dissipated in the rod is equal to the product of the square of the effective current and the resistance of the rod, and is also proportional to the square of the effective voltage divided by the resistance, it is necessary to cause the current flowing through the power circuit and the rod 1 to vary as the square root of the third power of the diameter, with the voltage drop across the rod being inversely proportional to the square root of the diameter. These conclusions result from consideration of the fact that the resistance of the rod is inversely proportional to the square of its diameter. Accordingly, when the diameter grows by a ratio of 1 to 30, there is an increase of approximately 160 times in the current flowing through the rod 1, while the voltage falls to approximately one-sixth of its initial value. The required variation in effective voltage is achieved in the switch circuit illustrated in FIG. 1 by varying the conduction angle of the triac 3 between approximately 0 and 150 electrical degrees during each half cycle. At the beginning of the process the conduction angle of the triac 3 is approximately 150°, and decreases steadily throughout the process, approaching a conduction angle slightly greater than 0° at the end of the process.

The need for a unit such as the modifier unit 10 to modify the voltage produced at the output of the filter 7 is apparent from a consideration of the difference between the effective current flowing through the rod 1 and the mean current, to which the voltage produced at the output of the filter 7 is proportional.

The effective voltage of an a.c. waveform is equal to the r.m.s. value of the voltage, irrespective of the waveform or form factor. Thus, when the applied a.c. voltage is U sin $\omega t$, where U is the amplitude of the voltage at a frequency equal to 2 $\pi/\omega$, and the triac 3 is switched on at an angle $\alpha$ following the beginning of every half cycle, for a conduction angle of $\phi = \pi - \alpha$, the effective voltage $U_{eFF}$ is equal to:

$$U_{eff} = \sqrt{\frac{1}{\pi}\int_\alpha^\pi (U^2 \sin^2 wt) dt} = \frac{U}{\sqrt{\pi}}\sqrt{\frac{\pi}{2} - \frac{x}{2} + \frac{\sin^2 \alpha}{4}}$$

For a resistive load, the effective current is proportional to the effective voltage. Thus, in order to derive a voltage which is proportional to the effective current flowing through the power circuit, it is necessary to square the instantaneous value of the current signal, extract its mean value over a half cycle, and derive the square root of such mean value.

The mean value $\bar{U}$ of the voltage in the power circuit is:

$$\bar{U} = \frac{1}{\pi}\int_\alpha^\pi (U \sin wt) dt$$

and the ratio $K$ between the effective and mean value is:

$$K = \sqrt{\pi} \; \sqrt{\pi/2 - \alpha/2 + \sin 2\alpha/4/1 + \cos \alpha}$$

Figure 2:
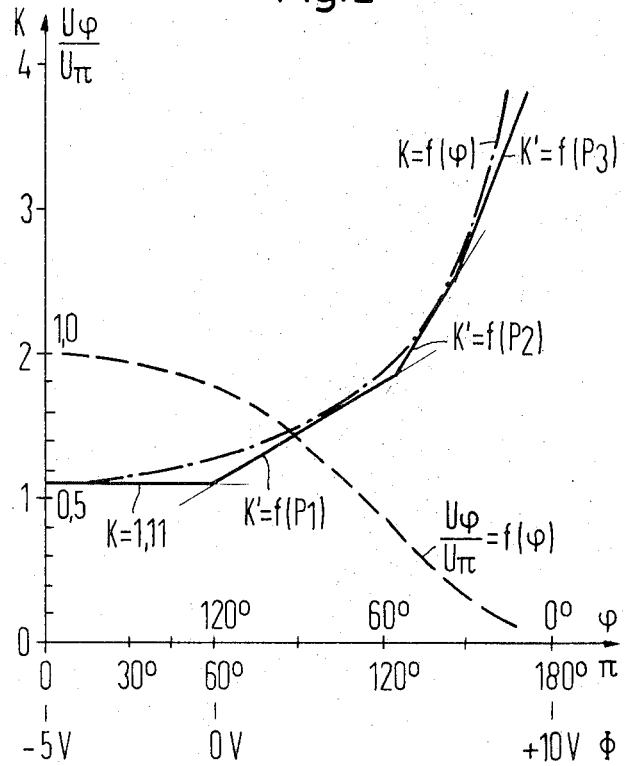
FIG. 2 is a graph of certain relationship which describe operation of the apparatus of FIG. 1.

It is apparent that the ratio $K$ differs markedly from unity, especially as $\alpha$ approaches $\pi$, for small conduction angles $\phi$. In FIG. 2 there is shown a graph of the ratio $K$, plotted against $\alpha$ and $\phi$. The effective voltage drop across the rod 1 is also plotted in FIG. 2 as the dashed line $U\phi/U\pi$. It is the function of the modifier unit 10 to modify the signal G produced at the output of the filter 7 so that the control unit 11 is controlled to maintain a constant effective current flowing through the rod 1 to maintain a constant temperature thereof. As the firing angle $K$ changes in proportion to the voltage produced by the modifier unit 10, the transfer function of the unit 10 must be $K$.

Figure 3:
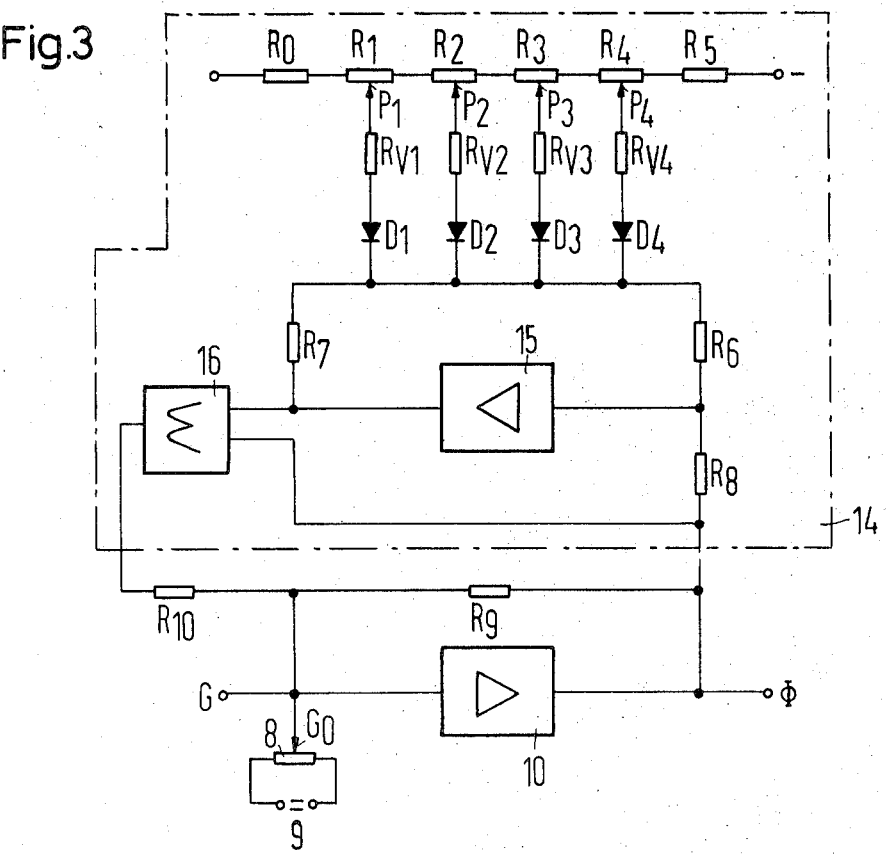
FIG. 3 is a schematic circuit diagram, partly in functional block diagram form, of a portion of the apparatus of FIG. 1.

As shown in FIG. 3, the unit 10 comprises an amplifier 10a having an input connected to receive the signal G from the filter 7, and producing an output $\phi$ which is the control voltage connected to the input of the control unit 11. The control voltage $\phi$ is also plotted along the X axis in FIG. 2, where its linear relationship to $\alpha$ can be seen. The amplifier 10a has a feedback resistor R9 for supplying feedback current from the output of the amplifier 10a to its input. In addition, the tap of the potentiometer 8 is connected to the input of the amplifier 10a. The connections of the potentiometer 8 and the amplifier 10a to the reference potential are omitted in FIG. 3 for the sake of clarity. The amount of bias supplied by the potentiometer 8 may be readily adjusted by regulating the position of the tap of the potentiometer 8.

Connected in parallel with the feedback resistor R9, another circuit 14 is provided for furnishing a further feedback signal. The circuit 14 is shown in FIG. 3 surrounded by a dashed line. It comprises an amplifier 15 connected to the output of the amplifier 10a by means of a resistor R8, and a summing unit 16 having one input connected to the output of the amplifier 15 and another input connected to the output of the amplifier 10a. The output of the summing unit 16 is connected by a resistor R10 to the input of the amplifier 10a.

The amplifier 15 has a feedback network including resistors R6 and R7, connected in series between the output of the amplifier 15 and its input, and a network including four diodes, D1, D2, D3 and D4, each having their cathodes connected to the junction between the resistors R6 and R7 and their anodes connected through individual resistors RV1–RV4 to the taps of individual potentiometers R1–R4. The potentiometers R1–R4 are connected as a voltage divider between a terminal 22, which is connected to a source of positive voltage, and a terminal 24, which is connected to a source of negative voltage. Two fixed resistors R0 and R5 are connected in series with the potentiometers to complete the voltage divider circuit. The specific voltage produced by each of the potentiometers R1–R4 is selected by adjusting its tap, providing the selected voltage to the anode of its respective diode D1–D4 through its resistor RV1–RV4. The potentiometers R1–R4 and the fixed resistors R0 and R5 all have relatively low values of resistance, compared to the resistances of the resistors RV1–RV4, so that the voltage P1–P4 at the taps of the potentiometers R1–R4 is substantially independent of the amount of current flowing through any of the diodes D1–D4. Accordingly, the current that flows through each of the diodes D1–D4 is dependent only on the value of its resistor RV1–RV4, and on the voltage level at the cathode of the diode. The voltage level at the junction between R6 and R7, to which all the cathode of the diodes are connected, varies in accordance with the amount of the voltage applied to the input of the amplifier 15, and when the voltage at the junction of the resistors R6 and R7 exceeds the potential of any of the potentiometers P1-P4, its associated diode is cut off.

The values of the resistors R6 and R7 are selected so that some of the current flowing through the diodes D1–D4 flows through the resistor R6 to furnish a feedback current, to the amplifier 15. When all of the diodes D1–D4 are conductive, the feedback to the amplifier 15 is a maximum, and it has minimum gain. The amplifier 15 functions as an inverter, so that feedback current flowing through the resistors R6 and R7 is 180° out of phase with the input current. As the potential at the input of the amplifier 15 falls, the output of the amplifier 15 increases in potential, and brings about a corresponding increase in potential at the junction between the resistors R6 and R7. As this potential rises from a minimum value to the value of voltage selected by one of the potentiometers R1–R4, one of the diodes D1–D4 is cut off. As the output voltage of the amplifier 15 continues to rise, each of the diodes D1–D4 is cut off in turn, and the feedback current applied to the input of the amplifier 15 through the resistor R6 is thereby reduced. Accordingly, the gain of the amplifier 15 increases with decreasing values of voltage applied to the input thereof. The slope of the characteristic of gain versus input voltage depends upon the selected voltage levels of the potentiometers R1–R4, and the values of the resistors RV1–RV4 connected thereto. As each diode is cut off, the input-output characteristic of the amplifier 15 assumes the form of a line having an increasing slope.

In the same manner, in response to rising voltages applied to the input of the amplifier 15, the diode network initially provides no feedback current, as all the diodes D1–D4 are cut off, and one by one the diodes D1–D4 become conductive as the output voltage falls in response to a rising input voltage. This reduces the gain of the amplifier 15 to give the input-output characteristic having a decreasing slope.

The summing device 16 is provided for the purpose of summing a portion of the output of the amplifier 10a with the output of the amplifier 15, and the result is supplied as a feedback input to the amplifier 15 through a resistor R10. The resistor R8, connected from the output of the amplifier 10a to the input of the amplifier 15, controls the input current supplied to the amplifier 15 from the amplifier 10a, and accordingly regulates the relative proportions of the two signals supplied to the summing unit 16. Alternatively, the summing unit 16 may be made adjustable, so that the relative proportions of these signals is under manual control. The gain of the amplifier 10a is a function of its input voltage, as a result of the diode network, with the result that the output of the amplifier 10a closely approximates the arithmetic mean value of current raised to the three/two power, so that is closely approximates the effective value of the current. This signal is applied to the control unit 11 to adjust the firing angle of the triac 3, accordingly when the effective current increases, the output of the modifier unit 10 closely follows any increase in the effective current flowing through the rod 1, and causes the control unit 11 to adjust the firing point of the triac 3 during each cycle in order to maintain a constant effective current flowing through the rod 1. The specific value of effective current is selectable by means of the potentiometer 8, which varies the level of the input signal applied to the amplifier 10a.

The characteristic of the circuit of FIG. 3 is illustrated in FIG. 2, where the series of four straight lines tangent to the $K$ ratio illustrate the gain of the amplifier 10a as a function of output voltage $\phi$. As the output voltage $\phi$ rises from $-5V$ to $+10V$, the gain increases exponentially, closely following the curve of the $K$ ratio. Each straight line corresponds to a different combination of the diodes D1–D4 being conductive. The first section, which is horizontal, corresponds to all of the diodes D1–D4 being cut off, so that the gain is constant, and independent of the input voltage. When the output voltage rises sufficiently to permit the output of the amplifier 15 to reach the potential P1 selected by the potentiometer R1, the diode D1 is unblocked, increasing the feedback by the amplifier 15, reducing its gain, which results in an increasing gain for the amplifier 10a. Since the diodes D1–D4 differ from ideal diodes, the straight lines shown in the graph of FIG. 2 are, in practice, blended together, eliminating the sharp corners between adjacent straight lines, and more closely approximating the graph of the K ratio.

Figure 4:
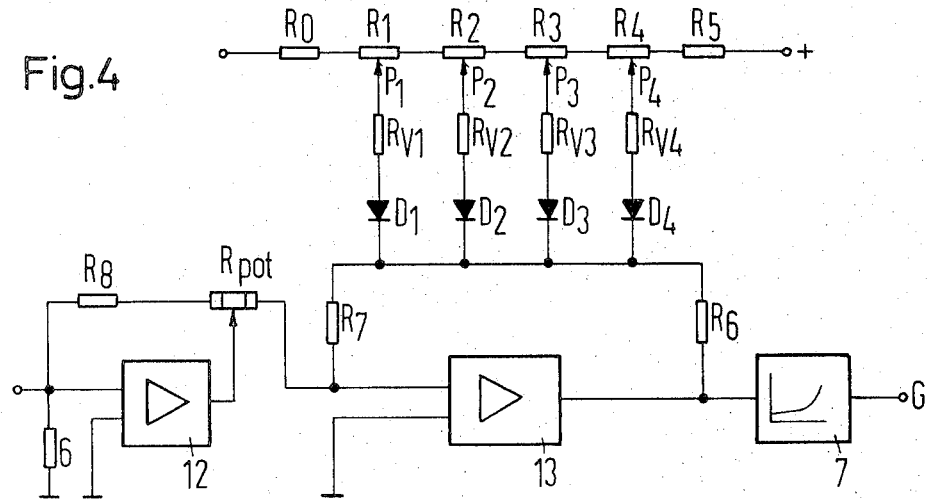
FIG. 4 is a schematic circuit diagram, partly in functional block diagram form, of alternative apparatus which may be employed for a portion of the system of FIG. 1.

In an alternative embodiment of the present invention shown in FIG. 4, the transformer 20 and the rectifier bridge 5 are omitted, and a small resistor 6a is placed in series with the power circuit including the a.c. source 2 and the rod 1. Accordingly an a.c. voltage is developed across the resistor 6a which corresponds to the instantaneous level of the current flowing through the rod 1.

The resistor 6a is connected to the input of an amplifier 12 which is provided with a feedback network including a potentiometer $R_{pot}$ and a fixed resistor R8. The amount of feedback is adjustable by means of varying the position of the tap of this potentiometer, and the output signal is derived from one end terminal of the potentiometer, the other end terminal being connected to the resistor R8, and the tap being connected to the input of the amplifier 12. The output of the amplifier 12 is connected to the input of an amplifier 13, which is provided with a feedback network including fixed resistors R6 and R7 and a diode network including diodes D1–D4. Each of the diodes D1–D4 is provided with an individual resistor RV1–RV4, which is connected from its anode to the tap of an individual R potentiometer R1–R4. The potentiometers R1–R4 are connected as four elements of a voltage divider which also includes fixed resistors R0 and R5 connected in series between a source of positive potential at the terminal 22 and a source of negative potential at the terminals 24. The amplifier 13 and its feedback system function in the same manner as described in connection with the amplifier 15 of FIG. 3, so that the amplifier 13 provides an output signal which is a function of the input voltage. The voltage applied by the amplifier 12, however, is an a.c. voltage, rather than the d.c. input voltage employed in the circuit of FIG. 3. The resistors RV1–RV4, and the positions of the taps of the potentiometers R1–R4 are adjusted to give a gain characteristic which is proportional to the input voltage, so that the amplifier 13 closely approximates the square of the input voltage, reversed in sign and amplified in the usual manner. The output of the amplifier 13 is therefore proportional to the square of the voltage developed across the resistor 6a, which, as pointed out above is proportional to the instantaneous current flowing through the rod 1. The output of the amplifier 13 is connected to an input of a filter 7 which produces at its output terminal a d.c. voltage G at an output terminal 26. The filter 7 functions to derive the arithmetic mean value of the signal applied thereto by the amplifier 13, so that the terminal 26 is provided with a d.c. voltage having a level proportional to the square of the r.m.s. current flowing through the rod 1. The terminal 26 is connected to the input of the control unit 11, so that the firing point of the triac 3 is controlled in accordance with the square of the effective current.

Although the output signal from apparatus of FIG. 4 is the square of the r.m.s. current, it will be appreciated that for any constant r.m.s. current flowing through the rod 1 the square of the r.m.s. current must also remain constant.

From the foregoing it is seen that the apparatus constructed in accordance with the present invention is adapted to provide a control signal for controlling the firing point of the triac 3 in accordance with the effective current flowing through the rod 1, in order to produce a condition in which the temperature of the rod 1 is maintained at a more nearly constant value throughout the entire process.

The potentiometer 8, shown in FIGS. 1 and 3, and the potentiometer $R_{pot}$, shown in FIG. 4, have the effect of adjusting the input voltage to the amplifiers 10a and 13, respectively. In this way, a particular value of effective current may be chosen, and the current flowing through the power circuit and through the rod 1 is thereafter maintained at that value. During the course of a process in which the diameter of the rod 1 increases, the appropriate effective current is chosen by manipulation of the potentiometer, in accordance with the diameter of the rod.

I claim:

1. In apparatus for electrically heating a growing semiconductor rod during a deposition process, including a heating source of alternating current connected to the semiconductor rod, an electronic switch connected in circuit with the rod and said heating source of alternating current to form a heating current circuit, a source of auxiliary voltage having an output voltage which varies with time connected to control said electronic switch to control the flow of heating current through said rod, a second current circuit inductively coupled to said heating circuit for providing a rectified signal representative of the heating current, and modifying means connected between said second current circuit and said source of auxiliary voltage for controlling said source of auxiliary voltage, said modifying means including a low pass filter, a control amplifier and manually adjustable means for controlling the addition of a bias potential to the output of said modifying means, said control amplifier having a pair of feedback resistors connected in series between its input and its output, a correction circuit including a plurality of potentiometers connected in series, the taps of each of said potentiometers being connected through individual resistors and diodes to the common connection between said feedback resistors.

2. Apparatus according to claim 1, wherein said low pass filter, said control amplifier and said manually adjustable means are connected in series.

3. Apparatus according to claim 1, wherein the output of said control amplifier is connected to the input of said low pass filter, and including a further amplifier interconnected between the input of said modifying means and the input of said control amplifier.

4. Apparatus according to claim 1, including a further amplifier, said further amplifier having its input connected to the output of said control amplifier and to the output of said manually adjustable means, said further amplifier having its output connected to the output of said modifying means and to the input of said control amplifier.

5. Apparatus according to claim 3, including a resistor coupling the output of said further amplifier with the input of said control amplifier, and a summing circuit connecting both the output of said further amplifier and the output of said control amplifier to the input of said further amplifier.

6. Apparatus according to claim 4, including a coupling resistor connected from the output of said summing circut to the input of said further amplifier and a feedback resistor connected between the input and the output of said further amplifier.

* * * * *